United States Patent [19]

Schoening et al.

[11] Patent Number: 4,701,298
[45] Date of Patent: Oct. 20, 1987

[54] LOW CAPACITY NUCLEAR REACTOR PLACED UNDERGROUND IN THE CAVITY OF A CYLINDRICAL PRESSURE VESSEL

[75] Inventors: Josef Schoening, Hambruecken; Winfried Wachholz, Gorxheimertal; Ulrich Weicht, Weinheim, all of Fed. Rep. of Germany

[73] Assignee: Hochtemperatur-Reaktorbau GmbH, Fed. Rep. of Germany

[21] Appl. No.: 866,921

[22] Filed: May 27, 1986

[30] Foreign Application Priority Data

May 25, 1985 [DE] Fed. Rep. of Germany ....... 3518968

[51] Int. Cl.[4] .................................... G21C 1/32
[52] U.S. Cl. .................... 376/273; 376/211; 376/296; 376/406
[58] Field of Search ............ 376/273, 293, 294, 295, 376/296, 298, 299, 381, 391, 406, 210, 211

[56] References Cited

U.S. PATENT DOCUMENTS 3,523,062  8/1970  Brown ............................. 376/295

FOREIGN PATENT DOCUMENTS 3009390  9/1981  Fed. Rep. of Germany ...... 376/299
3016402  11/1981  Fed. Rep. of Germany .
3335451  4/1985  Fed. Rep. of Germany .
867825  5/1961  United Kingdom ............... 376/293

Primary Examiner—Deborah L. Kyle
Assistant Examiner—Richard W. Wendtland
Attorney, Agent, or Firm—Robert J. Koch

[57] ABSTRACT

A low capacity nuclear reactor with spherical fuel elements in a subterranean configuration. The reactor is characterized by a compact construction and extensive elimination of active operating devices, such as charging installation, gas purification devices, regulating systems and safety systems. It is particularly suitable for the generation of thermal energy for heating purposes. A core vessel contains a pile of fuel elements also contains a portion of the graphite bottom and side reflector. Channels are provided in the part of the side reflector located inside the core vessel. Trim and shutdown rods are contained in the channels. The roof reflector rests on the stationary pile of fuel elements. The entire core vessel together with the components contained therein is removed following burnoff of the fuel elements. The heat generated in the core is transferred to a cooling system mounted on the inside of a pressure vessel enclosing the nuclear reactor by a cooling gas which flows from top to bottom. The cooling system is separated from the primary loop by a gas tight jacket.

14 Claims, 2 Drawing Figures

LOW CAPACITY NUCLEAR REACTOR PLACED UNDERGROUND IN THE CAVITY OF A CYLINDRICAL PRESSURE VESSEL

BACKGROUND OF THE INVENTION

1. Field of the Invention

The invention relates to a low capacity nuclear reactor. More particularly, the invention relates to an underground reactor in the cavity of a cylindrical pressure vessel with a pile of spherical fuel elements through which cooling gas flows top to bottom aided by a blower. The reactor has a removable steel core vessel with a graphite reflector comprising bottom, side, and roof reflectors surrounding the pile. The side reflectors exhibit channels to contain a plurality of absorber rods.

2. Description of the Related Art

A nuclear reactor of the type shown in West German DE-OS No. 30 16 402 is a high temperature reactor of modular configuration. A metal vessel, containing a fuel element pile located in a cavity of a concrete vessel closed off by a cover may be lifted out from the concrete vessel together with a metal base plate and the bottom, side and roof reflectors. The removal may be effected only following shutdown of the reactor and discharge of the spherical fuel elements and removal of the control rods and opening of the cover. At least one line connected to the base plate leads downward to remove the heated cooling gas which flows through the pile from bottom to top. The hot gas line leads to a second cavity containing a heat consumer such as a steam generator arranged parallel to a first cavity in the concrete vessel. DE-OS No. 30 16 402 alternatively proposes to extend the cavity containing the nuclear reactor and to arrange the heat consumer under the metal vessel rather than utilize a second cavity.

The state of the art also includes the nuclear reactor installation described in DE-OS No. 33 35 451, a high temperature reactor with spherical fuel elements. In this installation all of the components of the primary loop, such as the control and shutdown devices, are arranged within a steel reactor pressure vessel so that they may be installed or removed from above. Economical subterranean construction is thus possible. At least one discharge tube under the high temperature reactor is provided for removal of fuel elements. The tube leads laterally out of the reactor pressure vessel.

SUMMARY OF THE INVENTION

It is an object of the invention to provide a nuclear reactor which for the most part eliminates active operating installations such as charging devices, gas purification means, control systems, and safety systems. A reactor of this type is suitable for use in less industrialized areas and is operable with a reduced number of personnel and low maintenance requirements. Reactors of this type are particularly suited for applications such as generation of heat.

According to the invention as installation with the following elements achieves the desired object:

(a) side and bottom reflectors divided into an inner and outer reflector, whereby the inner reflector is arranged within a removable core vessel;

(b) a roof reflector is located entirely within the core vessel, resting directly on a stationary pile of fuel elements and which may be replaced by removing the core vessel;

(c) absorber rods provided in a displaceable manner for trimming and shutdown purposes only within a plurality of channels in the inner side reflector;

(d) a central opening closed by a cover located in the roof area of the pressure vessel for installation and removal of the core vessel and components and fuel elements installed therein;

(e) a cooling gas blower vertically mounted in a central position in the cover;

(f) a cooling system mounted on the entire inner side of the pressure vessel, for removal of heat generated in the fuel element pile from the pressure vessel;

(g) a gas tight jacket arranged in front of the cooling system on the side of the cavity, and a free annular space for the transport of cooling gas between the gas tight jacket and outer side reflector;

(h) the primary gas and the cooling system are designed in a manner such that safe removal of the decay heat is assured even in case of accidents;

(i) a primary loop structurally sealed, preferably by weld lip seals, eliminating requirement of forced ventilation and filter devices.

The nuclear reactor according to the invention has a compact configuration and is protected against external effects (crashing aircraft, pressure waves, sabotage, etc.) and accidents in the conventional part (pipeline fractures, etc.) by virtue of its subterranean location. Furthermore, the surrounding soil provides excellent radioactive radiation shielding.

This simple and economical concept yields an approximate capacity of 10 to 20 MW. Higher capacities may be obtained by a multiplication of the unit reactor. All necessary auxiliary devices are provided once only in order to further improve the economy of the installation.

This simple configuration results in low energy generation costs, capable of competing with the present fossil energy carriers.

Power operation of approximately 10 to 40 years is possible by the stationary fuel element pile. Subsequent to the reactors' operational lifetime, the fuel elements are replaced by removal together with the core vessel, the inner reflectors, and the trim and shutdown rods. An installation for continuous and discontinuous charging may thus be eliminated. Retention of the trim and shutdown rods in the core vessel assures maintenance of a subcritical state of the fuel elements in the core vessel during their installation and removal.

The service life of the entire installation is extended according to the invention by enabling removal of a core vessel and the components in that highly stressed structural parts such as, for example, the side and the roof reflector, may be replaced. These structural parts additionally may be repaired.

The pressure vessel may be a prestressed cast vessel, a prestressed concrete vessel, a reinforced concrete vessel or a steel pressure vessel.

The cooling gas, preferably helium, is transported by a blower with a rotor protruding into a free space located between the cover and the roof reflector. The gas traverses the fuel element pile from top to bottom. The cooling gas is distributed over the bottom of the pressure vessel following its passage through the pile, and subsequently flows in an annular space between the outer side reflector and the gas tight jacket upwards into a free space above the roof reflector. It then reenters the blower.

A cooling system mounted on the inner side of the pressure vessel is capable of removing all of the heat generated. Heat is transferred by conduction and radiation to the cooling system. The medium circulating in the cooling system (for example, water if the nuclear reactor is used as a heating reactor) is conducted in its own piping. The piping is completely separated from the primary loop by a gas tight jacket so that leakage from the cooling system cannot penetrate into the primary loop. Requirements necessitating a rapid reactor protection system to control reactivity accidents are therefore not present.

Gas purification installations may be eliminated due to the absence of water carrying components in the primary loop and the fact that during operation no additions of fuel elements are taking place and no contaminations are able to penetrate into the primary loop.

Advantageously, the gas pressure in the primary loop may be chosen so that it is higher than the pressure of the medium in the cooling system. This provides an additional degree of safety in view of a potential entry of the medium into the primary loop.

The fuel elements have a high heavy metal content, enabling an extended retention time of the fuel elements in the core.

Drives for absorber rods are conveniently provided in passages in the outer periphery of the cover.

It is advantageous to locate a gas conduction jacket in a free space over the roof reflector separating the low pressure and the high pressure parts and the suction and compression sides of the blower, respectively. The gas conduction jacket is connected to the core vessel.

The gas tight jacket may be equipped with ribs on its side facing the annular space in order to improve heat transfer from the heated cooling gas to the cooling system. The outer side reflector may rest directly on longitudinally arranged ribs. In this manner, cooling channels are provided for upward flow of cooling gas.

A metal support installation may be provided to support the core vessel. The support installation in turn rests directly on the bottom of the pressure vessel.

The blower motor may advantageously be located in a passage through the cover which may be equipped with a removable closure for the center installation and removal. This facilitates the maintenance of the motor and the blower.

The pressure vessel may be supported on a foundation. A concrete cover may be conveniently located above the pressure vessel with good accessability. The cover protects the nuclear reactor in combination with the subterranean construction from external effects. A light construction hall may be provided over the cover to house auxiliary and supply systems.

In a nuclear reactor according to the invention the absorber rods located in the inner side reflector are intended only for trimming and shutdown. The reactor power is regulated solely by the rpm or speed of the blower and the secondary flow of the cooling system, by utilizing the stabilizing property of the negative temperature coefficient. Active controls by absorber rods may be eliminated.

The trim and absorber rods serve in combination with a burnable neutron poison (for example gadolinium) to absorb the initial excess activity. The variation of the excess activity taking place during the operation of the reactor is compensated by the displacement of the trim and shutdown rods. In the process, the trim and shutdown rods are extracted manually from time to time gradually. No regulation or automatic controls are required for these slow variations in reactivity. The trim and shutdown rods are moved only if, due to a decline in the reactor output, not enough heat is being generated, for example if the quality of the hot water is inadequate. Brief fluctuations of fuel element temperatures are tolerated over a relatively broad range without difficulty due to the high temperature resistance of the ceramic fuel elements.

The removal of the nuclear reactor after burnout of the fuel elements may be advantageously effected by initially placing a shielding bell directly onto the pressure vessel and then, subsequent to raising the cover, drawing the core vessel into the shielding bell.

The primary loop and the cooling system are designed so that the decay heat is removed safely even in case of accidents.

In case of a blower failure decay heat is transferred by natural convection to the cooling system, whereby the direction of flow of the cooling gas in the fuel element pile is reversed. This does not endanger the blower and its drive motor by their exposure to heat. A potential pressure rise in the primary loop may be taken into consideration in the layout of the primary loop, or it may be compensated by an overflow of the cooling gas into gas reservoirs. The cooling system design provides for an adequate volume of the cooling gas circulating in the cooling system piping for removal of the decay heat by natural convection.

Decay heat is transferred to the cooling system by heat conduction to the graphite reflector and by thermal radiation from the grahite reflector to the cooling system in case of a pressure relief accident. Normally prevailing temperatures in the reactor core are not appreciably exceeded.

Decay heat is safely removed without damage to the fuel elements or the release of activity from the fuel elements even in case of the failure of the cooling system. The decay heat is removed in this case by conduction through the pressure vessel into the surrounding soil and into the atmosphere. If a steel reinforced or prestressed concrete vessel is used as the pressure vessel, thermal conduction may be affected favorably by a special layout of the steel reinforcements. This simple construction requires only a very slight monitoring effort.

BRIEF DESCRIPTION OF THE DRAWINGS

The nuclear reactor according to the invention is explained in more detail by an exemplary embodiment in the drawings.

DETAILED DESCRIPTION OF THE PREFERRED EMBODIMENT

Figure 1:
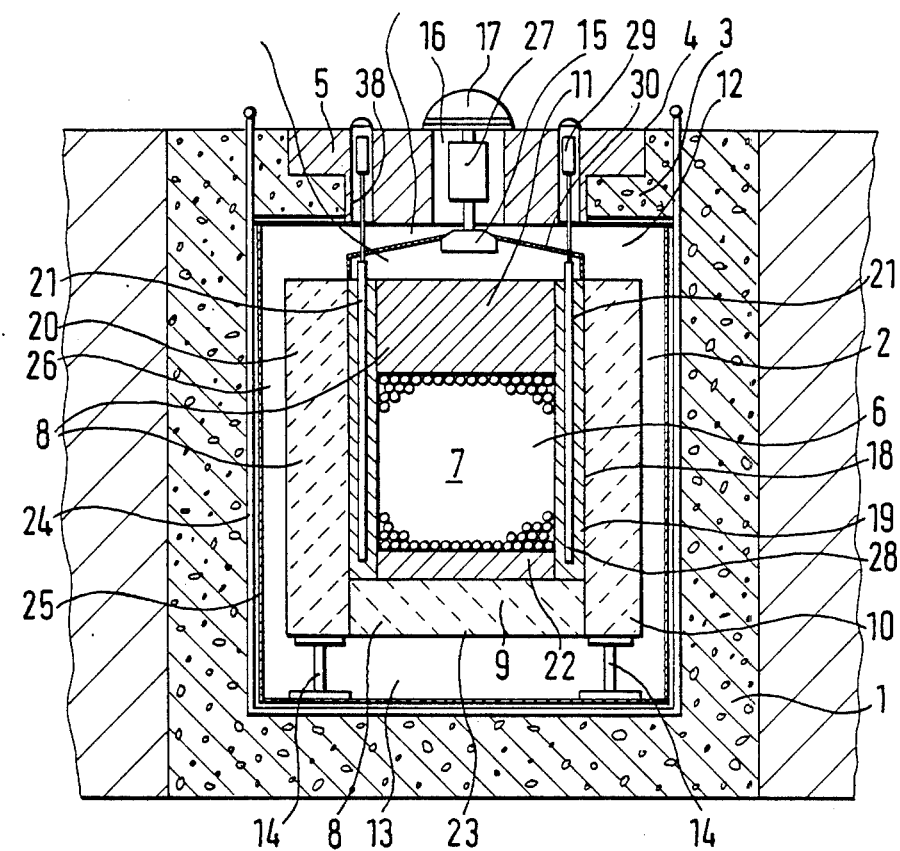
FIG. 1 shows a schematic longitudinal section through a nuclear reactor according to the invention.

FIG. 1 shows a steel reinforced concrete subterranean cylindrical pressure vessel 1. The vessel encloses a cavity 2. The vessel 1 has a center opening 4, in a cover region 3 which is closed by a removable cover 5. The cavity 2 houses a nuclear reactor 6. The core of the reactor 6 is a stationary pile 7 of spherical fuel elements. The pile 7 has a diameter of approximately 1.2 to 1.5 m and a height of 1.5 to 2.5 m. The power density in the core is approximately 4 to 6 $MW/m^3$ and has a total capacity yield of 10 to 20 MW. The fuel elements, which are prepared by a hot or cold press method, contain approximately 20 to 40 g heavy metal per pellet.

The pile 7 is surrounded, on all sides, by a graphite reflector 8, having a bottom reflector 9, a side reflector 10 and a roof reflector 11. The graphite reflector 8 is approximately 0.75 to 1.0 m thick.

The roof reflector 11 rests directly on the pile 7. A free space 12 is located between the roof reflector 11 and the cover 5. Another free space 13 is provided between the bottom reflector 9 and the bottom of the pressure vessel 1. A metal support installation 14 is located in the free space which supports the nuclear reactor 6 on the bottom of the pressure vessel.

A blower 15 circulates cooling gas, preferably helium, which flows from top to bottom through the pile 7. The blower 15 is located in a vertical position centrally under the cover 5, its rotor protrudes into the free space 12. The blower drive motor 27 equipped with an external closure part 17 is installed in a passage 16 of the cover 5.

A steel core vessel 18, closed at the bottom, laterally surrounds the pile 7 and houses part of the side reflector 10 and bottom reflector 9. The side and bottom reflectors are divided into inner 19, 22 and outer 20, 23 reflector portions respectively. A plurality of vertical channels 28 are provided in the inner side reflector 19. Absorber rods 21 for trimming and shutdown are located in a displaceable manner in the channels 28. Drives 29 for the absorber rods 21 are provided in passages 38 of the cover 5.

The core vessel 18 together with the inner side reflector 19, the roof reflector 11, the fuel elements and the absorber rods 21, may be removed from above following removal of the cover 5. A shielding bell is used in the process. The absorber rods 21 assure and maintain a subcritical state of the pile 7 during the removal and installation process. The core vessel 18 is removed after the fuel elements are sufficiently burned off.

A cooling system 24 is mounted over the entire inner side of the pressure vessel 1. The cooling system 24 is made up of pipes through which cooling water flows and is designed for safe removal of heat generated in the pile 7 during normal operation and during the removal of the decay heat. A gas tight jacket 25 is provided in the cavity 2 in front of the cooling system 24 to prevent entry of water into the primary loop. An annular space 26 is located between the jacket and the outer side reflector 20.

A gas conduction jacket 30 is provided in the free space 12 separating the suction side 50 and compression side 51 of the blower 15. It is connected to the upper end of the core vessel 18.

The output of the reactor is regulated by the rpm of the blower 15 and the secondary flow of the cooling system 24 alone, utilizing the negative temperature coefficient inherent in fuel pile reactors. The blower 15 suctions the cooling gas from the free space 12 and transports it into the pile 7. In normal operation the pressure is adjusted to approximately 8 to 10 bar. The temperature of the gas rises from 300° C. to 500° C. during its flow through the pile 7. The heated cooling gas passes into the free space 13 through openings in the core vessel and the bottom reflector 9. It is there distributed and moved into the annular space 26. From the annular space 26 the gas returns to the space 12.

The pressure of the cooling gas is chosen so as to be higher than the pressure of the water in the cooling system 24.

According to the invention a design as in nuclear reactor 6 advantageously avoids requirement of installations such as a charging device, a gas purification installation, a reactor protection system, and active regulating systems which are therefore not provided. The reactor thus has very low energy generation costs and a low necessary maintenance effort.

Figure 2:
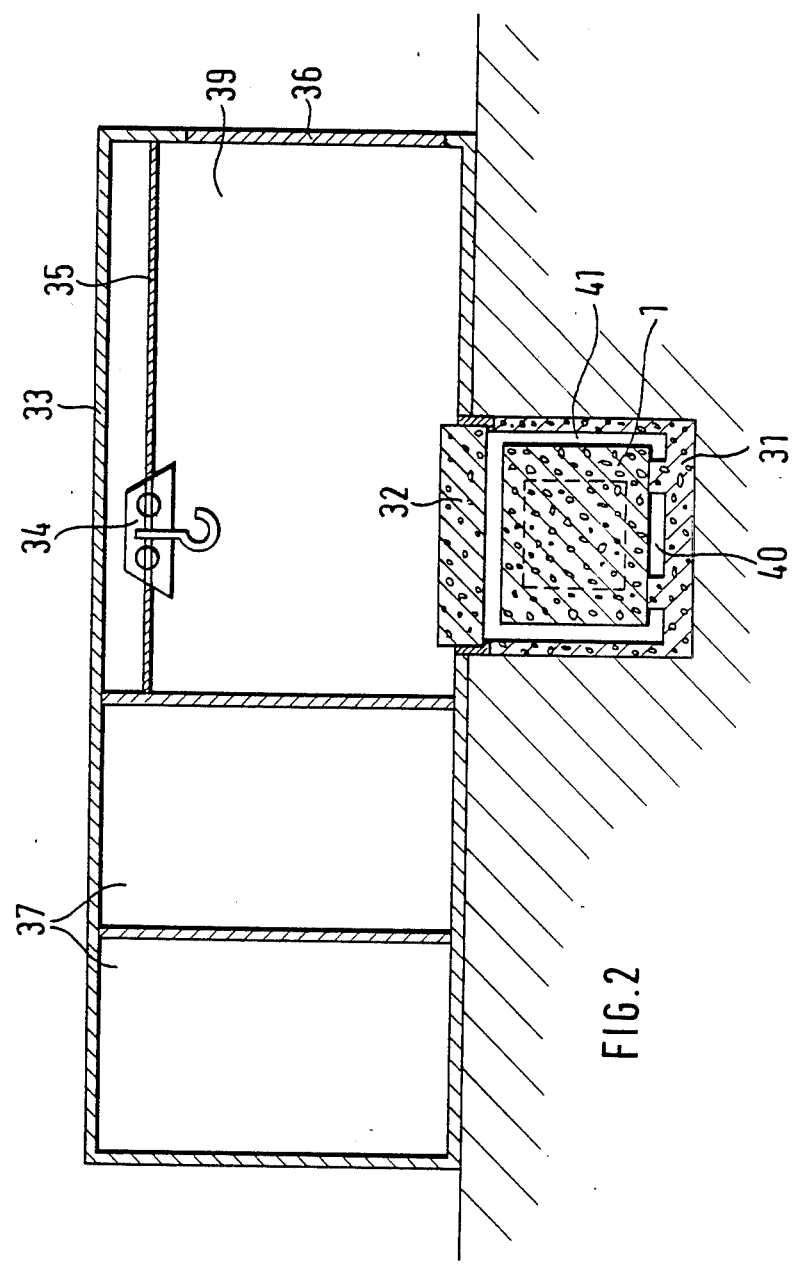
FIG. 2 shows the entire installation with the aboveground structures.

FIG. 2 shows the entire nuclear reactor installation with the pressure vessel 1, located underground in a cavity 40, and resting on a foundation 31. A concrete shield 32 closes off the top of the cavity 40 in a light duty hall 33. The hall 33 has a gate 36 and is divided into a workshop and operating room 37 and a room 39 for the installation and removal of the core vessel 18. For installation and removal of the core a crane 34 running on a plurality of rails 35 is provided. The cavity 40 is lined with concrete. The intermediate space 41 between the wall of the cavity and the pressure vessel 1 is monitored for leakage and activity. A slight underpressure may be established in relation to the environment by a slight suction. Potential leakages are drained off discontinuously in a programmed manner.

What is claimed is:

1. An underground nuclear reactor comprising:
   a cylindrical pressure vessel;
   a pile of spherical fuel elements located within a removable core vessel arranged within a cavity defined by said cylindrical pressure vessel;
   an outer side reflector laterally disposed against an external surface of said removable core vessel;
   an outer bottom reflector located beneath said removable core vessel;
   an inner bottom reflector beneath said pile within said removable core vessel and removable therewith;
   an inner side reflector surrounding said pile within the removable core vessel and removable therewith;
   a plurality of channels in said inner side reflector;
   absorber means for trimming and shutdown of said reactor displaceably disposed within said channels;
   a roof reflector located within the removable core vessel and resting directly on said fuel elements;
   said cylindrical pressure vessel having an opening in a cover region of sufficient size to allow removal of said removable pressure vessel;
   a cover arranged in said opening;
   blower means for forcing primary loop circulation of cooling gas downward through said pile arranged in said cover;
   cooling system means for transferring heat generated in said pile from the pressure vessel arranged on an inner surface of said pressure vessel;
   jacket means for gas tight sealing of said cooling system means against said cavity;
   an annular space between said outer reflector and said jacket means for transport of said cooling gas;
   means for structurally sealing said primary loop circulation and avoiding need of forced ventilation and filter devices;
   wherein said primary loop and said cooling system means operate to safely remove decay heat following an accident.

2. A nuclear reactor as in claim 1, wherein said primary loop exhibits a pressure higher than a pressure of medium in said cooling system means.

3. A nuclear reactor as in claim 1, wherein said fuel elements exhibit a high heavy metal content.

4. A nuclear reactor as in claim 1, further comprising drive means for said absorber means located in passages in said cover.

5. A nuclear reactor as in claim 1, further comprising gas conduction jacket means for separating suction and compression sides of said blower connected to said removable core vessel and located in a free space between said roof reflector and said cover.

6. A nuclear reactor as in claim 1, wherein said jacket means exhibits ribs on a side facing said annular space.

7. A nuclear reactor as in claim 6, wherein said ribs are longitudinally arranged, extend to rest on said outer side reflector, and define cooling channels.

8. A nuclear reactor as in claim 1, further comprising means for supporting said removable core vessel resting directly on a bottom surface of said pressure vessel.

9. A nuclear reactor as in claim 1, further comprising a passage for housing a blower motor in said cover, wherein said passage is equipped with a removable closure.

10. A nuclear reactor as in claim 1, further comprising:
foundation means for supporting said cylindrical pressure vessel;
means for covering said pressure vessel resting on said foundation means; and
a light construction hall enclosing said means for covering for housing auxiliary and supply systems.

11. A nuclear reactor as in claim 1, further comprising means for regulating reactor output by blower controlling and secondary flow of the cooling system means rates and utilizing negative temperature coefficients.

12. A nuclear reactor as in claim 11, wherein said absorber means and burnable neutron poisons initially absorb excess reactivity and said absorber means are manually displaceable to compensate for variations of excess reactivity occurring during operation of said reactor.

13. A nuclear reactor as in claim 1, further comprising a shielding bell for placing directly onto the pressure vessel and means for drawing said removable core vessel into the shielding bell following raising of said cover for discharge of said nuclear reactor following burnoff of said fuel elements.

14. A nuclear reactor as in claim 1, wherein the decay heat is removed by natural convection and a potential pressure rise in said primary loop is compensated by an overflow of the cooling gas into gas reservoirs upon failure of the blower means;
decay heat is transferred by thermal conduction and radiation from said outer side reflector to said cooling system means upon a pressure release accident; and
decay heat is transferred by conduction from said pressure vessel to surrounding soil and to the atmosphere upon a failure of said cooling system means.

* * * * *